United States Patent [19]

Goebel

[11] 4,060,668
[45] * Nov. 29, 1977

[54] PRIMARY ELECTROCHEMICAL CELL

[75] Inventor: Franz Goebel, Ashland, Mass.

[73] Assignee: GTE Laboratories Incorporated, Waltham, Mass.

[*] Notice: The portion of the term of this patent subsequent to Apr. 25, 1994, has been disclaimed.

[21] Appl. No.: 614,467

[22] Filed: Sept. 18, 1975

Related U.S. Application Data

[63] Continuation-in-part of Ser. No. 539,749, Jan. 9, 1975, abandoned.

[51] Int. Cl.² .......................................... H01M 6/114
[52] U.S. Cl. ................................... 429/122; 429/164; 429/178; 429/194; 419/218
[58] Field of Search .................. 136/121, 122, 83 R, 136/13, 107, 20, 100 R, 22, 86 D, 120 FC; 429/122, 178, 194, 164, 209, 168; 252/511, 502; 423/445, 448, 414

[56] References Cited

U.S. PATENT DOCUMENTS

| 3,510,353 | 5/1970 | McHenry | 429/94 |
| 3,676,222 | 7/1972 | Deibert | 136/121 |
| 3,796,606 | 3/1974 | Lehmann et al. | 136/13 |
| 3,870,565 | 3/1975 | Bonnemay et al. | 136/121 X |
| 3,922,174 | 11/1975 | Heller | 136/6 LN |

Primary Examiner—Anthony Skapars
Attorney, Agent, or Firm—Irving M. Kriegsman; Robert A. Seldon

[57] ABSTRACT

A primary electrochemical cell is described in which a novel granular cathode material is utilized. The cathode is formed from about 40 to 99 weight percent of carbon black, at least 1 weight percent of a mechanical binder which is inert in the primary electrochemical cell and the remainder thereof is graphite. The cathode material may be formed by mixing the individual components together with a quantity of a suitable liquid to form a uniform slurry. The slurry is then dried at room temperature to remove the liquid. The dried mixture is crumbled into fine particles. The particles are cured at an elevated temperature to stabilize the mechanical binder. The resulting material when utilized as the cathode material of a primary electrochemical cell provides a porous carbon structure of high surface area in which a network of large channels exists for continual diffusion of electrolytic solution to the carbon cathodic particles throughout the entire volume of the cell cathode regardless of the cell size.

11 Claims, 1 Drawing Figure

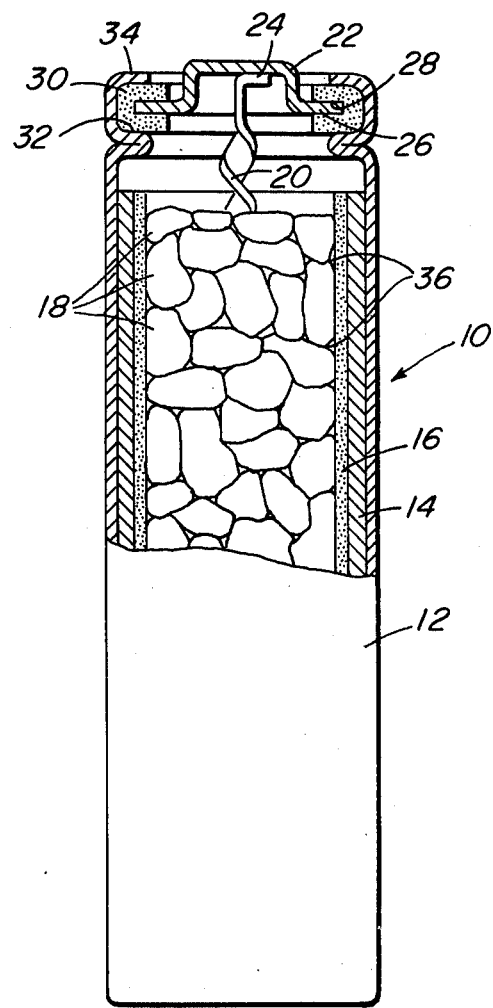

PRIMARY ELECTROCHEMICAL CELL

REFERENCE TO PARENT APPLICATION

This application is a continuation-in-part of co-pending application Ser. No. 539,749, filed Jan. 9, 1975, and now abandoned, the priority of which is claimed.

BACKGROUND OF THE INVENTION

The present invention is related generally to primary electrochemical cells and is more particularly concerned with a novel cathode material for use in such cells and a method for its formation.

Primary electrochemical cells are utilized for a wide variety of applications and are commonly available in a significant assortment of sizes and shapes. Furthermore, a number of electrochemical systems are known for incorporation into such primary electrochemical cells. A large portion of these systems utilize a carbon cathode material. Typically, the carbon cathode material has been formed as a paste and deposited as such within the electrochemical cell container. Because of the fluid form of this paste, albeit viscous, it was necessary to place a heavy separator between the carbon cathode material and the particular anode material utilized. This separator was required to prevent direct contact between the anode and cathode materials. Necessarily, these separators became quite thick to prevent self-discharge of the cells due to internal shorts between the cathode and anode materials. Such a thick separator material naturally increases the internal resistance of the cell thereby decreasing the output which may be derived therefrom.

In a copending patent application entitled "A Primary Electrochemical Cell and a Preformed Cathode Therefor," by F. Goebel and W. P. Brissette, filed Jan. 9, 1975, and now assigned Ser. No. 539,748 which is assigned to the assignee of the instant application and which is being filed concurrently herewith, a novel preformed porous carbon cathode is disclosed and claimed. This cathode has significant advantages over prior art cathodes; however, when such a cathode is incorporated into larger capacity primary electrochemical cells, such as "D" cells or larger, the cathode structure prevents the cells from fulfilling their complete function. That is, the preformed cathodes have a multitude of miniscule pores over the outer surface through which the electrolytic solution of the cell diffuses. During discharge of the cell, various reaction products are formed. These products can clog the pores in the cathode so that the life of the cell is prematurely terminated.

SUMMARY OF THE INVENTION

Accordingly, it is an object of the present invention to provide a new and improved cathode structure for use in primary electrochemical cells which has large channels throughout the cathode so that a more complete utilization of the cathode is possible.

A second object of the present invention is to provide a cathode material which provides better and more uniform operation; particularly in larger size electrochemical cells.

Another object of the present invention is to provide such a new and improved cathode which incorporates more active carbon material and in which the possibility of internally shorting the cell is greatly reduced.

A further object of the invention is to provide such a new and improved cathode which is more homogeneous, more easily formed, more reproducible and more easily handled in manufacturing operations.

Briefly, the invention in its broadest aspect comprises a new and improved cathode material for use in a primary electrochemical cell and the method of its formation. The cathode material is comprised of an aggregate of porous semi-rigid globules for placement within the primary electrochemical cell and has the following composition: from about 40 to 99 weight percent of carbon black, at least 1 weight percent of a mechanical binder which is inert in the primary electrochemical cell, and the remainder being graphite. The method for forming the cathode material comprises the following series of steps. A quantity of carbon black is mixed with a quantity of a mechanical binder which is inert in the primary electrochemical cell and an amount of a suitable liquid. The quantity of the mechanical binder is at least 1 percent by weight of the resulting cathode material. The amount of liquid is at least an amount which is effective to cause the mix to form small, generally spherical masses. The mix is cured for a time sufficient to stablize the mechanical binder.

Further objects, advantages and features of the invention will be apparent from the following detailed description of the preferred embodiment taken together with the accompanying drawing.

BRIEF DESCRIPTION OF THE DRAWING

In the Drawing,

The sole FIGURE is a side elevational view, partially in section, of a primary electrochemcial cell according to the present invention showing the cathode material not is section.

DETAILED DESCRIPTION OF THE PREFERRED EMBODIMENTS

Referring to the FIGURE of the drawing, a primary electrochemical cell embodying the present invention is designated generally by the reference numeral 10. The primary electrochemical cell 10 is comprised of a cylindrical outer casing 12 which is closed at one end and which serves to contain the desired electrochemical system. In many configurations, the outer casing 12 is formed of a conductive material and acts as a first terminal of the primary electrochemical cell 10.

In this embodiment, a layer of anode material 14 is disposed in mechanical and electrical contact with a conductive outer casing 12 throughout the major portion of the internal length and circumference of the casing 12. In certain configurations, the anode also is in contact with the bottom of the casing 12. A thin porous separator 16 is disposed internally of and coextensive with the annulus of anode material 14 to insure electrical isolation between the cathode and anode materials. In the center of the primary electrochemical cell 10, there is located a quantity of carbon cathode material globules 18 according to the present invention. Diffused throughout the cathode material globules 18 and the separator 16, there is an electrolytic solution suitable for use with the particular electrochemical system in the cell 10. The individual globules 18 each have a multitude of minute pores for allowing the electrolytic solution to contact the individual cathodic particles. In addition, larger channels 36 are formed between the globules 18. These channels serve to insure that the electrolytic solution can diffuse throughout the cathode material and contact the cathodic particles regardless of the size of the cell.

A cathode current collector 20 is impressed into the cathode material globules 18 over a major portion of its length. A top portion 24 of the cathode current collector 20 is specially provided for affixing the cathode current collector 20 to a metal cathode terminal cap 22. The cathode terminal cap 22 is fitted within the open end of the outer casing 12 and is insulated electrically therefrom by means of an insulating ring 30. The insulating ring 30 rides against an internal shoulder 32 formed in the outer casing 12 above the cell's electrochemical materials. The ring 30 supports the cathode terminal cap 22 by receiving a radially extending lower rim 26 of the cap 22 in an internal groove 28. A top lip 34 of the outer casing 12 is rolled or crimped over the upper surface of the ring 30 to bring the various mating surfaces into sealing contact. A cathode current collector which may be incorporated into the cathode of the present invention is disclosed in a copending patent application entitled "Primary Electrochemical Cell and Improved Cathode Current Collector Therefor," by F. Goebel and N. Marincic, which application is assigned to the assignee of the present application, is being filed concurrently herewith, and now assigned Ser No. 539,750 now abandoned.

The cathode material globules according to the present invention have the following general composition: from about 40 to 99 weight percent of carbon black, at least 1 weight percent of mechanical binder which is inert in the primary electrochemical cell, and the remainder being graphite. The following table provides a number of examples of specific preformed carbon cathode compositions according to the present invention.

| EXAMPLE NO. | GRAPHITE wt. % | CARBON BLACK wt. % | FLUOROCARBON POLYMER BINDER wt. % |
|---|---|---|---|
| 1 | 0 | 99 | 1.0 |
| 2 | 0 | 98 | 2.0 |
| 3 | 0 | 95 | 5.0 |
| 4 | 2.5 | 95 | 2.5 |
| 5 | 3.5 | 93 | 3.5 |
| 6 | 5.0 | 90 | 5.0 |
| 7 | 10 | 85 | 5.0 |
| 8 | 15 | 80 | 5.0 |
| 9 | 20 | 70 | 10.0 |
| 10 | 23 | 74 | 3.0 |
| 11 | 25 | 68 | 7.0 |
| 12 | 25 | 70 | 5.0 |
| 13 | 30 | 65 | 5.0 |
| 14 | 34 | 60 | 6.0 |
| 15 | 38 | 57 | 5.0 |
| 16 | 40 | 55 | 5.0 |
| 17 | 45 | 50 | 5.0 |
| 18 | 50 | 42 | 8.0 |
| 19 | 50 | 40 | 10.0 |
| 20 | 58 | 40 | 2.0 |

The graphite and carbon black utilized in the formation of the cathode material globules are preferably of commerical grade or better purity. The graphite particle size is preferably maintained below 650 mesh and the carbon black utilized is preferably compressed about 50%. These preferred specifications for the graphite and carbon black are selected to insure a homogeneous product which will not contribute to a deterioration of the discharge parameters of the cell through the incorporation of reactive impurities in the cell.

The preferred mechanical binder for utilization in the cathode material of the present invention is a fluorocarbon polymer which is inert in the primary electrochemical cell of the invention. Two examples of preferred fluorocarbon polymers of particular utility in the present invention are those identified by the tradenames Teflon and Kel-F. Teflon is a registered trademark of E. I. duPont de Nemours and Company for tetrafluoroethylene fluorocarbon polymers and fluorinated ethylenepropylene resins. Kel-F is a registered trademark of the 3M Company for a series of fluorocarbon products including polymers, of chlorotrifluoroethylene and certain copolymers. The examples of the foregoing table may be utilized with either of these commercially available fluorocarbon polymers with essentially equivalent results. The function of the fluorocarbon polymer in the present invention is to stabilize the mechanical strength of the cathode material globule by forming chain-like connections between the various particles of graphite and carbon black to form a mechanical binding network so that a semi-rigid configuration may be achieved for the cathode material globules.

The particular compositions for the cathode material which are preferred are given in weight percent for the resulting article:

| | |
|---|---|
| Graphite | 0-30 |
| Carbon black | 65-99 |
| Fluorocarbon polymers | 1-10 |

The particular composition chosen results in a cathode material having varying porosity characteristics. This variance in porosity is beneficial because it permits a concomitant variance in the discharge rates available from the resulting primary electrochemical cells.

The combination of the porous globules of cathode material 18 and the network of large channels 36 throughout the cathode of a primary electrochemical cell insures that the deposit of reaction products in the pores will not prevent the cell from fulfilling its complete useful life. The reaction products do not accumulate rapidly enough to cause blockage of the larger channels 36. Therefore, this type of cathode structure may find application in any size electrochemical cell; however, particular utility is found in larger cells such as "D" size and larger in which thick cathode structures are utilized.

The preformed cathode of the present invention may be produced according to a method which also is a part of that invention. As a specific example of that method, the following procedure is provided.

EXAMPLE

About 350 grams of carbon black are dry mixed with about 35 grams of graphite for about 15 hours. Approximately 1.5 liters of a 50% isopropanol solution in water is added to the dry mixed carbon and graphite. This is mixed for about 2 additional hours. Teflon in suspension, and in an amount of approximately 5% by weight of the dry mix, is added to the slurry of carbon and graphite as a mechanical binder and mixing continuted to disperse the Teflon uniformly through the slurry. The remainder is now in the form of a dough which is dried initially for about 15 hours at room temperature. The dried material is crumbled to form small particles. The particles are then cured at approximately 300° C for about 2 to 3 hours to form the globules of porous carbon cathode material for placement in the primary electrochemical cell.

The relative concentrations of the carbon black, graphite and mechanical binder may be varied according to the ranges set forth hereinabove.

The dry mixing of the carbon black and graphite is done to achieve a uniform distribution between the carbon and graphite particles. The time required for this procedure is largely a function of the equipment used. In fact, in those instances where no graphite particles are used or in which sufficient wet mixing time is used, the dry mixing step may be eliminated: however, it remains in the presently preferred method.

The liquid is a matter of choice so long as it succeeds in wetting the carbon and graphite particles. The quantity of liquid to be utilized varies according to the choice of liquid and the relative proportions of graphite and carbon black. A determination of such effective quantities is standard to one of ordinary skill in the art.

Preferably, the suitable liquid is one which volatilizes completely so that no contamination residue is left in the cathode. However, if such a residue is inert to the chemicals in the electrochemical cell, a non-totally volatilized liquid may also be used so long as the residue does not significantly affect the cathode composition.

The following are utilizable as liquids in the practice of the invention: glycols, such as ethylene glycol, butylene glycol and 2, 3-hexandiol; alcohols, particularly lower molecular weight alcohols, such as methanol, ethanol, and isopropanol; ketones, such as acetone, methyl-ethyl-ketone, and diethyl ketone; alkony-substituted alcohols, such as 2-ethoxy-ethanol, 2-butoxy-ethanol, and 2-methoxy-ethanol; amides, such as formamide; amines, such as isobutylamine and terbutylamine; water; and mixtures thereof, particularly mixtures of water with other liquids. However, water, glycols, alcohols and mixtures thereof form the presently preferred group from which the liquid may be selected.

The wet mixing time is that period which is required to form a uniform slurry of the various ingredients. That period is affected by the particular equipment used, the liquid selected, and the blend of ingredients in the slurry.

The drying time and temperature are determined by the volatility of the liquid, the quantity used, and practicality. The drying time and temperature are, of course, interrelated. Room temperature is usually suitable; however, an elevated temperature may be used so long as the temperature is below the minimum temperature required to cure the mechanical binder.

In curing step of the procedure, the mechanical binder is cured so that the binder particles become linked thereby capturing the carbon particles within a resulting highly porous matrix. The temperature selected is a function of the mechanical binder chosen and causes the particles of dried slurry to form globules of varying size. The globules are individual semi-rigid bodies of material which may be emplaced in primary electrochemical cells.

In addition to the foregoing method, the cathode materials of the present invention may be produced by mixing only enough of the liquid with the dry mixed materials to cause those materials to form small spherical shapes. These spherical masses are then directly cured to form the globules. Also, the crumbling step in the former procedure may be eliminated and the material broken apart after curing.

The aforementioned procedues produce generally differently shaped particles of cathode material which are respectively flakes, spheres and irregular polyhedrons. In the present context globules should be understood to include all such shapes.

The cathode material of the present invention is for use especially in primary electrochemical cells which have cathode depolarizers that can be electrochemically reduced on a high surface area carbon cathode, especially those cells having an alkali metal anode and a non-aqueous electrolytic solution. Included in the former groups are the familiar carbon-zinc cells. In the latter group are included a relatively recently developed class of cells wherein the electrolytic solution includes an inorganic oxyhalide of sulfur or phosphorus as the solvent material and a solute dissolved therein to make the solution ionically conductive. Suitable oxyhalide solvents are phosphorus oxychloride, thionyl chloride, sulfuryl chloride, or mixtures thereof. Such oxyhalide solvent materials additionally function as cathode depolarizers as they are electrochemically reduced on the surface of the cathode material during operation of the cell. Suitable electrochemical systems (i.e., anode, cathode and solutes) are set forth in copending application Ser. No. 685,214 filed 5/11/76, the disclosure of which is incorporated herein by reference. The most promising of this type of cell has a lithium anode and a solvent/depolarizer which is selected from the group set forth above.

Primary electrochemical cells having a lithium anode and an electrolytic solution as described above have been found to be particularly suitable for use with the carbon cathode materials especially when combined with a metallic current collector. Such cells provide better and more uniform contact between the cathode material and the current collector since the cathode material expands during discharge thereby improving contact between the cathode material and collector and filling the space between the anode and the cathode.

The probability of intracellular shorting is reduced greatly over prior art types of primary electrochemical cells since the cathode material is of a definite shape and cannot diffuse through a separator to contact the anode material. Therefore, the separator used in cells having the globular cathodes of the present invention may be very thin thereby greatly reducing the internal cell resistance.

While there have been shown and described what are considered to be preferred embodiments of the present invention, it will be obvious to those of ordinary skill in the art that various changes and modifications may be made therein without departing from the spirit and scope of the invention as defined by the appended claims.

We claim:

1. A cathode material for placement in a primary electrochemical cell containing an electrolyte comprising: an aggregate of porous semi-rigid globules having a composition of from about 40 to 99 weight percent of carbon black and at least 1 weight percent of a mechanical binder which is inert in the primary electrochemical cell, the remainder being graphite, a plurality of fluid-conducting channels being defined between boundaries of adjacent globules to insure diffusion of the electrolyte throughout the cathode material during the life of the cell.

2. A cathode material according to claim 1, wherein the mechanical binder is a fluorocarbon polymer.

3. A cathode material according to claim 2, wherein the cathode material has the following composition as given in weight percent:

| | |
|---|---|
| Graphite | 0 – 30 |
| Carbon black | 65 – 99 |
| Fluorocarbon polymer | 1 – 10 |

4. A primary electrochemical cell comprising:
an outer cell casing;
a first terminal on the exterior of the casing;
a primary electrochemical system including
  an anode material connected to the first terminal,
  a cathode material comprising an aggregate of semi-rigid globules for placement in the primary electrochemical cell and having a composition of from about 40 to 99 percent of carbon black and at least 1 weight percent of a mechanical binder which is inert in the primary electrochemical cell, the remainder being graphite, and
  an electrolytic solution including a cathode depolarizer that can be electrochemically reduced on the surface of the carbon cathode,
  a plurality of fluid conducting channels being defined between the boundaries of adjacent globules to enable diffusion of the electrolytic solution throughout the cathode material during the life of the cell;
a second terminal located on the exterior of the casing;
means for electrically insulating the second terminal from the first terminal; and
a cathode current collector connecting the cathode material to the second terminal.

5. A primary electrochemical cell according to claim 4, wherein the mechanical binder is a fluorocarbon polymer.

6. A primary electrochemical cell according to claim 5, wherein the cathode material has the following composition as given in weight percent:

| | |
|---|---|
| Graphite | 0 – 30 |
| Carbon black | 65 – 99 |
| Fluorocarbon polymer | 1 – 10 |

7. A primary electrochemical cell according to claim 4, wherein the anode material includes an alkali metal.

8. A primary electrochemical cell according to claim 4, wherein the electrolytic solution includes a solvent which consists essentially of an inorganic oxyhalide of phosphorus or sulfur, and a solute dissolved therein, said inorganic oxyhalide being electrochemically reduced on the surface of the cathode during operation of the cell.

9. A primary electrochemical cell according to claim 8, wherein the solvent is phosphorus oxychloride, thionyl chloride sulfuryl chloride, or mixtures thereof.

10. A primary electrochemical cell according to claim 9, wherein the anode material is lithium.

11. A primary electrochemical cell according to claim 4, wherein the anode material is lithium and the solute is lithium tetrachloroaluminate.

* * * * *